W. LOUDEN.
WATER BOWL.
APPLICATION FILED OCT. 17, 1918.
1,296,586.
Patented Mar. 4, 1919.
2 SHEETS—SHEET 1.
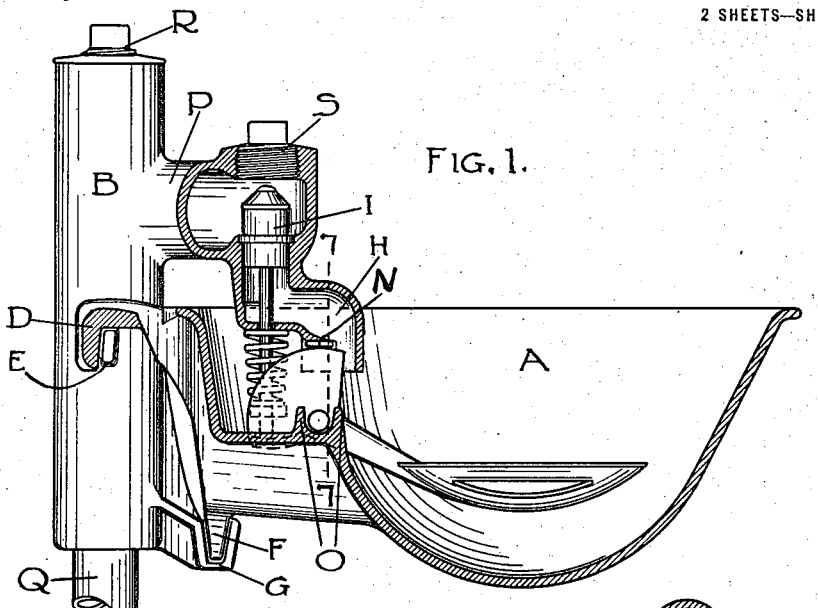
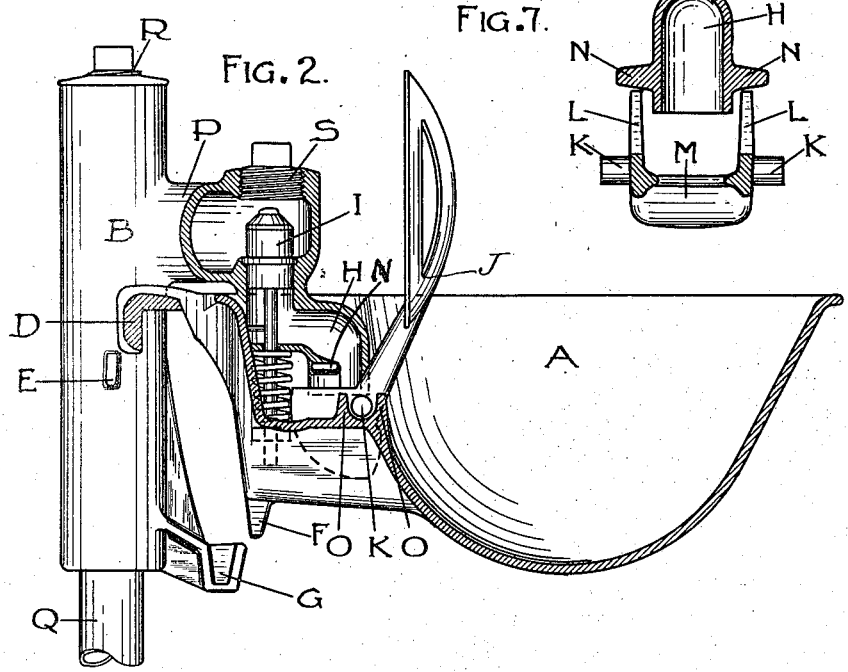
WITNESSES:
Albert C. Johnson
Glen Treon
INVENTOR
William Louden W. LOUDEN.
WATER BOWL.
APPLICATION FILED OCT. 17, 1918.
1,296,586.
Patented Mar. 4, 1919.
2 SHEETS—SHEET 2.
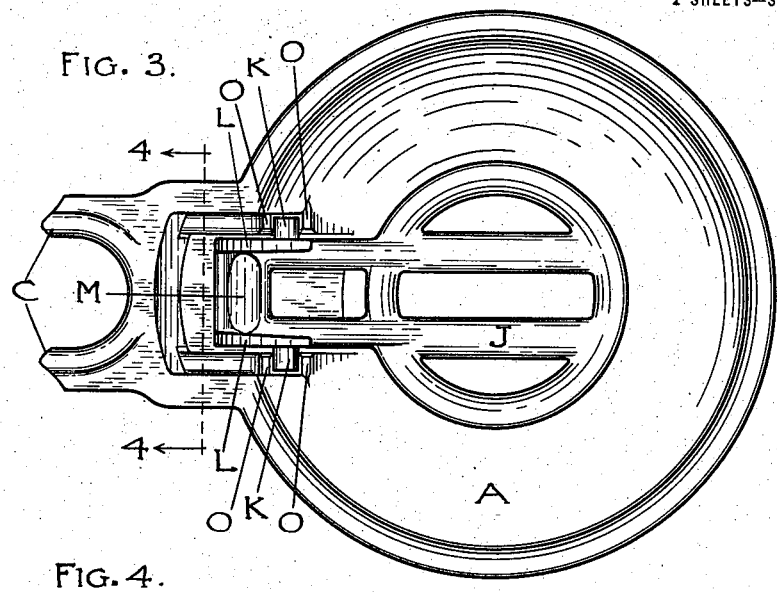
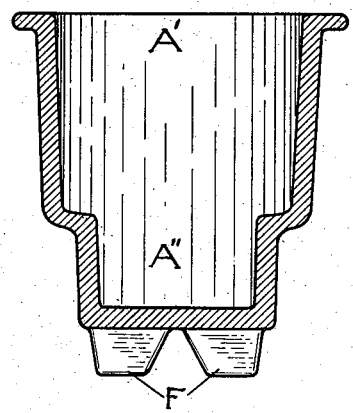
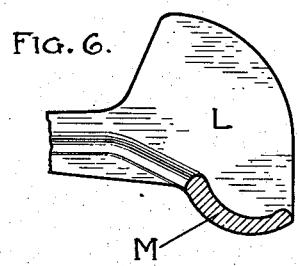
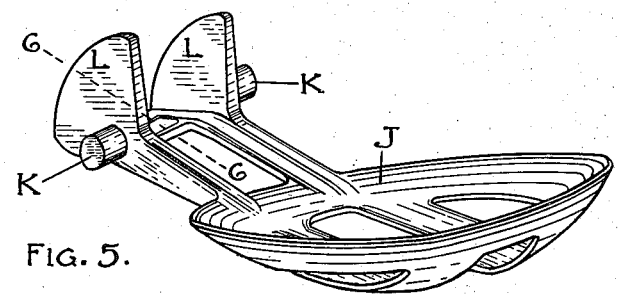
WITNESSES:
Albert E. Johnson
Glen Treon
INVENTOR
William Louden.

UNITED STATES PATENT OFFICE.

WILLIAM LOUDEN, OF FAIRFIELD, IOWA.

WATER-BOWL.

1,296,586.  Specification of Letters Patent.  Patented Mar. 4, 1919.

Application filed October 17, 1918. Serial No. 258,609.

*To all whom it may concern:*

Be it known that I, WILLIAM LOUDEN, a citizen of the United States, residing at Fairfield, in the county of Jefferson and State of Iowa, have invented a new and useful Improvement in Water-Bowls, of which the following is a specification.

This invention relates to drinking bowls for cattle and other domestic animals mounted on a support and having a nose piece for opening a valve and admitting the water, and it consists of the construction and arrangement of parts, whereby the bowl will be held in position or be permitted to be removed by causing the nose piece to assume different positions, and of other features which will be hereinafter described and pointed out in the claims.

In the accompanying drawings which form a part of this specification, Figure 1 is a side view of a water bowl and its connections,—partly in section,—embodying the features of my invention. Fig. 2 is the same showing some of the parts in a different position. Fig. 3 is a top view of the bowl detached from its connections. Fig. 4 is a vertical section on line 4—4 of Fig. 3 looking in the direction of the arrow. Fig. 5 is an enlarged detail view. Fig. 6 is a vertical section on line 6—6 of Fig. 5, showing a portion of one end of this figure in reversed position. Fig. 7 is a vertical cross section on line 7—7 of Fig. 1 of the central parts hereafter described.

Referring to the drawings, A represents the bowl and B a support to which the bowl is connected, the support being preferably a part of the water supply conduit. The rear end of the bowl is provided with a somewhat narrowed extension which has forked ends C which are fitted with downwardly projecting lips or prongs D. The support B has a lug E on each side, (only one of which is shown in the drawings) and the lips or prongs D are adapted to catch over these lugs and thus connect the bowl to the support. The lower end of the extension is fitted with a downwardly forked projection F which is adapted to catch on or over an extension G on the lower end of the part B, the extension G being notched or otherwise fitted for connection with the forked portion of the extension F, thus forming a mutually engaging connection between the bowl and the support. By this means the bowl will be rigidly held in place while it may be readily lifted and disconnected therefrom as shown by Fig. 2.

The water supply conduit which is preferably combined with the part B is extended over the rearwardly extended portion of the bowl and is extended downwardly so as to form a spout H to convey the water into the bowl. In an appropriate part of this extension of the water supply conduit a valve I is installed having a downwardly projecting stem upon which a coiled spring is mounted as plainly shown in Figs. 1 and 2. The coiled spring holds the valve in closed position in the usual way which is well understood by those skilled in the art and need not be described here. To operate this valve a member which may be called a nose piece J is used which is shown in perspective by Fig. 5. This nose piece is provided with a narrowed extension having pivot pins K and upwardly and outwardly extending quadrant shaped parts L, the lower portions of which are connected by a concave shaped web M.

The extended portion of the bowl is fitted with recesses to receive and support the pivot pins K so that when the nose piece is in position the concave shaped web M will be immediately under the lower end of the valve stem. When in this position with a downward pressure on the body of the nose piece, by the nose of the animal, or otherwise, it will, turning on its pivot, raise the web M and bring it in contact with the lower end of the valve stem, which will raise the valve I and thus open it and admit water to the bowl. As soon as the pressure is removed from the body of the nose piece, the tension of the coiled spring will overcome the upward pressure of the concave web M against the valve stem and will close the valve I and shut off the water.

To hold the bowl in position on the part B, as shown in Fig. 1, and to prevent it from being accidentally disconnetced, as shown in Fig. 2, I place a lug N on the spout H, preferably one on each side, as most plainly shown in Fig. 7, which is a vertical cross section of the spout H and the extended part of the nose piece immediately below it. When the nose piece J is in its normal position the quadrants L will be closely in contact with these lugs N, and will prevent the accidental lifting of the bowl from its connected position on the support B. When however, it is desired to remove the bowl all that is necessary is to turn the body of the nose piece up on its pivot, as shown in Fig. 2, when the quadrant L will not come in contact with the lug N, and the bowl may be readily lifted from its connected position and be removed for cleaning or for any other purpose.

As stated, it is preferable that two quadrants L, and two lugs or shoulders N, one on each side of the spout H, be used, but the structure may be formed so that when the member which is pivoted in the bowl is in normal position it will come in contact with an adjacent fixed portion which will form a stop and prevent the bowl from becoming disengaged from its support; and when said pivoted member is moved out of its normal position it will not come in contact with said portion forming the stop but will be free from it and will permit the disengagement of the connection between the bowl and its support and will thereby permit the removal of the bowl.

In Fig. 2 the bowl is shown only partly removed from the support B. When in this position all that is necessary to completely disconnect it is to move the bowl downward so the lips D will pass down by the lugs E, and the projection F pass the extension G, letting the bowl continue to move downward until its rear upper edge is below the lower end of the valve stem. The bowl will now be entirely removed from the support and its connections.

The upper portion of the rear extension of the bowl which is designated by A' is made wider than the lower portion which is designated by A'', there being offsets between the upper and lower portions as most plainly shown by Fig. 4. On these offsets near their inner ends recesses are formed to receive and support the pivot pins K in their pivoted position, so that the nose piece may be held in its proper position and be allowed to move on its pivot. These recesses are preferably formed by two pairs of upstanding lugs O, cast on the upper edges of each of the aforesaid offsets, their adjacent edges being cast integral with the sides of the extension above the offsets and spaced the proper distance apart to receive the pivots. In this way the recesses for the pivots K may be made in casting the bowl without any material extra expense and the nose piece may be readily set in place or be taken out of the bowl when it is removed from its connections.

When the part B is used as a water supply conduit, it is cast hollow and is provided with a horizontal extension P in which the valve I is inserted and of which the spout H is a part or is attached thereto. Its upper and lower ends are preferably screw threaded so that a water pipe Q may be inserted in one end, and a threaded plug R may be inserted in the other end as may be required. Another threaded plug S is also inserted in the extension P opposite the valve I which plug is taken out when the valve is inserted or taken out. These matters, however, may be arranged to suit requirements, and other changes in the details may be made without departing from the spirit of my invention.

What I claim is—

1. The combination of a water bowl and a support, mutually engaging parts on said bowl and support, said parts being separable by a movement of the bowl in a direction parallel to the contacting faces of the engaging parts, a fixed portion projecting into the bowl, and a member pivoted within the bowl and adapted when in its normal position to come in contact with said projecting fixed portion and prevent the separating movement of the bowl, but when turned on its pivot out of its normal position, to be free from said projecting fixed portion, whereby the engaging parts may be separated and the bowl be removed from the support without the movement of any additional parts.

2. The combination of a water bowl with a part to which it is connected and from which it may be removed by raising it sufficiently to disengage the connection, a water valve and a member pivoted in the bowl and adapted to operate the water valve and also to prevent the disengagement of said connection when in its normal position by coming in contact with a fixed portion and when moved out of its normal position to become disengaged from said fixed portion and permit the disengagement of the connection.

3. The combination of a water bowl with a part to which it is connected and from which it may be removed by raising it sufficiently to disengage the connection, a water valve and a nose piece pivoted in the bowl so as to open the water valve when its outer end is pressed down by the nose of an animal or otherwise and when in any of its lowered positions to prevent the disengagement of the bowl connections by coming in contact with a fixed portion, and when in raised position to permit the disengagement of said connections by being out of contact with said fixed portion.

4. The combination of a water bowl having a rear extension with a part to which said extension is connected, and from which it may be removed by raising it sufficiently to disengage the connection, a water valve, a nose piece having a rear extension pivoted in the rear extension of the bowl, means on the extension of the nose piece to open the water valve, and means to prevent the raising of the bowl to disengage its connection when the nose piece is in a normal position, but when raised out of its normal position to permit the disengagement of said connections.

5. The combination of a water bowl having a rear extension provided with forked upper ends and downwardly projecting lips on said ends, a water supply conduit having lugs on opposite sides with which said lips are adapted to engage, a laterally projecting extension on the lower end of said conduit, and a downwardly projecting lug on the lower end of the rear extension of the bowl, said lug being adapted to engage with said lateral extension whereby the bowl will be held in position and be removed by raising it to disengage said connections, a horizontal extension on said conduit extending over the bowl, a valve in said conduit extension, a nose piece having an extended end pivoted in the rear extension of the bowl, means on the extended end of the nose piece to open the valve and also means to engage the overhanging portion of the conduit and prevent the raising of the bowl when the nose piece is in normal position, but to permit the raising of the bowl and the disengagement of its connections when the nose piece is in elevated position.

6. The combination of a water bowl having a rear extension, the lower portion of said extension being narrower than the upper portion and having a lateral offset on each side between the upper and lower portions of said extension, a pair of upstanding spaced apart lugs on each of the offset portions having their adjacent edges joined to said upper sides of the extension, a water supply conduit, a valve in said conduit, and a pivoted member having an extension located between the extended sides of the bowl and provided with pivot pins inserted in the spaces between the upstanding lugs, and the movement of the extended end of the member on its pivots being adapted to open the valve and admit water to the bowl.

7. The combination of a water bowl with a support, separable mutually engaging means between said bowl and support, a water supply conduit projecting over the bowl, a valve in said conduit, and a member pivoted in the bowl, adapted to open the valve, and when in its normal position to come in contact with the projecting portion of the water supply conduit which will form a stop and prevent the disengagement of the connection between the bowl and the support, but when moved out of its normal position the member will be free from the stop and will permit the removal of the bowl.

WILLIAM LOUDEN.

Witnesses:
EARCEL E. EASTON,
R. L. HESTON.